(12) United States Patent
Hersh

(10) Patent No.: US 7,039,865 B1
(45) Date of Patent: May 2, 2006

(54) SYSTEM AND METHOD FOR DETERMINING THE COMMUTATIVITY OF COMPUTATIONAL OPERATIONS

(75) Inventor: Clifford L. Hersh, Berkeley, CA (US)

(73) Assignee: ANTs Software, Inc., Burlingame, CA (US)

(*) Notice: Subject to any disclaimer, the term of this patent is extended or adjusted under 35 U.S.C. 154(b) by 843 days.

(21) Appl. No.: 09/884,280

(22) Filed: Jun. 19, 2001

(51) Int. Cl.
*G06F 17/18* (2006.01)
*G06F 17/30* (2006.01)

(52) U.S. Cl. ............... 715/530; 715/500.1; 715/511; 715/539; 707/1; 707/8; 707/203

(58) Field of Classification Search ........... 715/500.1, 715/511, 530, 539; 707/1, 8, 203
See application file for complete search history.

(56) References Cited

U.S. PATENT DOCUMENTS

| | | | | |
|---|---|---|---|---|
| 4,901,230 A | * | 2/1990 | Chen et al. | 711/149 |
| 5,671,407 A | * | 9/1997 | Demers et al. | 707/8 |
| 5,781,910 A | * | 7/1998 | Gostanian et al. | 707/201 |
| 6,240,414 B1 | * | 5/2001 | Beizer et al. | 707/8 |
| 6,324,535 B1 | * | 11/2001 | Bair et al. | 707/4 |
| 6,629,152 B1 | * | 9/2003 | Kingsbury et al. | 719/313 |
| 6,754,657 B1 | * | 6/2004 | Lomet | 707/8 |
| 6,772,154 B1 | * | 8/2004 | Daynes et al. | 707/8 |

* cited by examiner

Primary Examiner—Stephen Hong
Assistant Examiner—Joshua D. Campbell
(74) Attorney, Agent, or Firm—Carr & Ferrell LLP

(57) ABSTRACT

A system and method for executing computational operations upon elements of a data structure. The method includes determinations of the commutativity of the computational operations. If the computational operations are determined to be commutative the computational operations are executed regardless of order.

9 Claims, 5 Drawing Sheets

SYSTEM AND METHOD FOR DETERMINING THE COMMUTATIVITY OF COMPUTATIONAL OPERATIONS

CROSS REFERENCE TO RELATED APPLICATIONS

This application is related to co-pending application Ser. No. 09/729,515 entitled "Method and System for Enhanced Concurrency in a Computing Environment", by Clifford L. Hersh and Herbert W. Sullivan, filed on Dec. 4, 2000, the disclosure of which is hereby incorporated by reference.

BACKGROUND

1. Field of the Invention

The invention relates generally to the field of computer algorithms and more particularly to a system and method for determining the commutativity of computational operations.

2. Description of the Related Art

Pending computational operations such as updating entries in a database are conventionally stored in an ordered list. For each pending operation on the list, upon execution of the operation, an affected row in the database is locked until a commit or roll back. The affected row is locked in order that other pending operations do not intercede and produce inconsistent results. For example, if the list includes two updates to a cell in the database row, the affected row is locked so that a first update operation executes and commits before a second update operation executes and commits. In this manner, the integrity of the database is maintained.

The execution of such computational operations using locks is expensive. For example, if two cashiers in a store have to post updates to the same account, the cashier who posts his update first proceeds while the cashier who posts his update second has to wait while the first cashier's update is executed. While in this example the productivity of the second cashier may not necessarily be adversely affected by waiting, in a situation where hundreds and possibly thousands of cashiers are posting updates to the same account, such waiting adversely affects the productivity of the cashiers.

With the integration of computational operations enabled by the increase in computational speeds and the decrease in the cost of storage, conventional locking techniques have forced many operations to be done as batched operations. Thus, all updates to a particular account for example, are executed after the close of business so as to maintain the productivity of those making updates to the particular account.

While such batched operations are effective in maintaining account information, their performance does not allow for efficiencies provided by realtime computation. For example, the ordering of inventory in an inventory control system dependent upon batched operations must be performed after the execution of the batched operations rather than in realtime when the inventory is needed.

Using the locking technique of the prior art further requires that the lists of pending operations be processed by server machines generally located in geographically distinct locations from a central location where the database is maintained. Thus an enterprise having operations in a plurality of locations must maintain a server machine at each location at great cost to the enterprise.

Thus, there is a need in the art for a system and method of performing computation operations which provides for realtime computation. Such a system and method preferably reduces the number of server machines required to maintain information in a database.

SUMMARY OF THE INVENTION

A system and method for executing computational operations upon elements of a data structure. The method includes determinations of the commutativity of the computational operations. If the computational operations are determined to be commutative the computational operations are executed regardless of order. Otherwise the computational operations are executed in order.

The invention further includes a method for executing two or more computational operations upon elements of a data structure, including the steps of determining if any of the computational operations to be executed are operable upon the same element, determining if any of the computational operations determined to be operable upon the same element are in kind operations, determining if any of the computational operations determined to be operable upon the same element and to be in kind operations are addition or assignment operations, and executing the computational operations determined to be operable upon the same element, to be in kind operations, and to be addition operations.

Aspects of the invention include a computer-implemented method for executing computational operations upon elements of a data structure and a computer implemented method for determining the commutativity of computational operations. Another aspect includes a computer program recorded on a computer-readable medium for causing a computer to effect the method as described above.

The foregoing and other objects and advantages of the disclosed system and method for executing computational operations upon element of a data structure will become apparent to those of ordinary skill in the art after having read the following detailed description of the preferred embodiments that are illustrated in the various drawing figures.

DETAILED DESCRIPTION OF THE INVENTION

The invention provides a system and method for determining the commutativity of computational operations. Two operations are commutative if the same result is obtained regardless of the order in which the operations are performed. Thus if two operations are determined to be commutative, the need for locking while either operation executes is eliminated as the order of execution will not affect the result.

Figure 1:
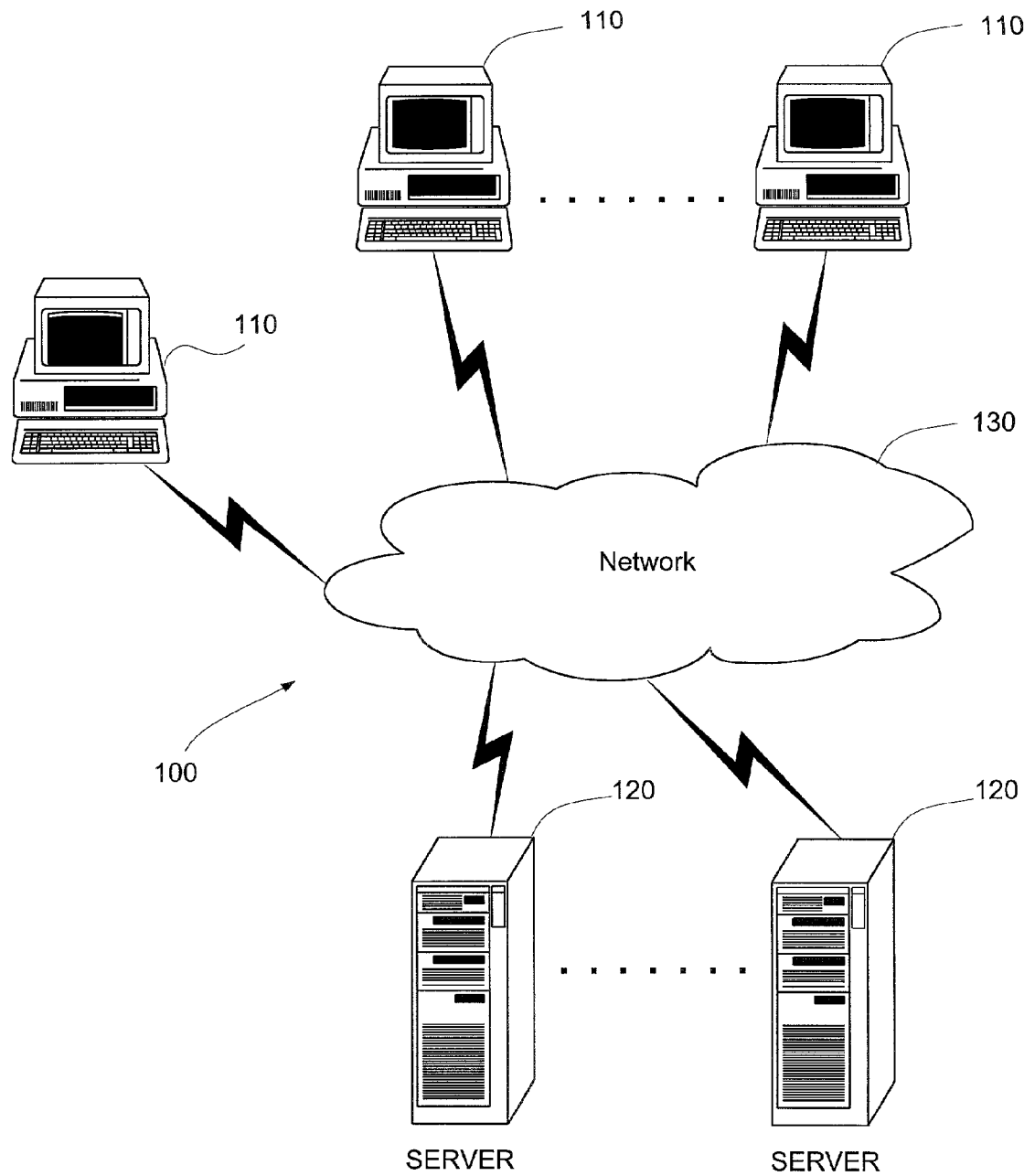
FIG. 1 is a block diagram illustrating a client/server architecture of the prior art/

A preferred embodiment of the invention is practiced in the context of a conventional client/server architecture generally designated 100 as illustrated in FIG. 1. A plurality of client machines 110 and server machines 120 are coupled to a network 130 such as the Internet. The method of the invention is preferably implemented as a computer program which runs on a server machine 120 but which may alternatively be distributed throughout the system 100. Further, a database may reside on any of the client machines 110, server machines 120 or be distributed throughout the system 100.

Figure 2:
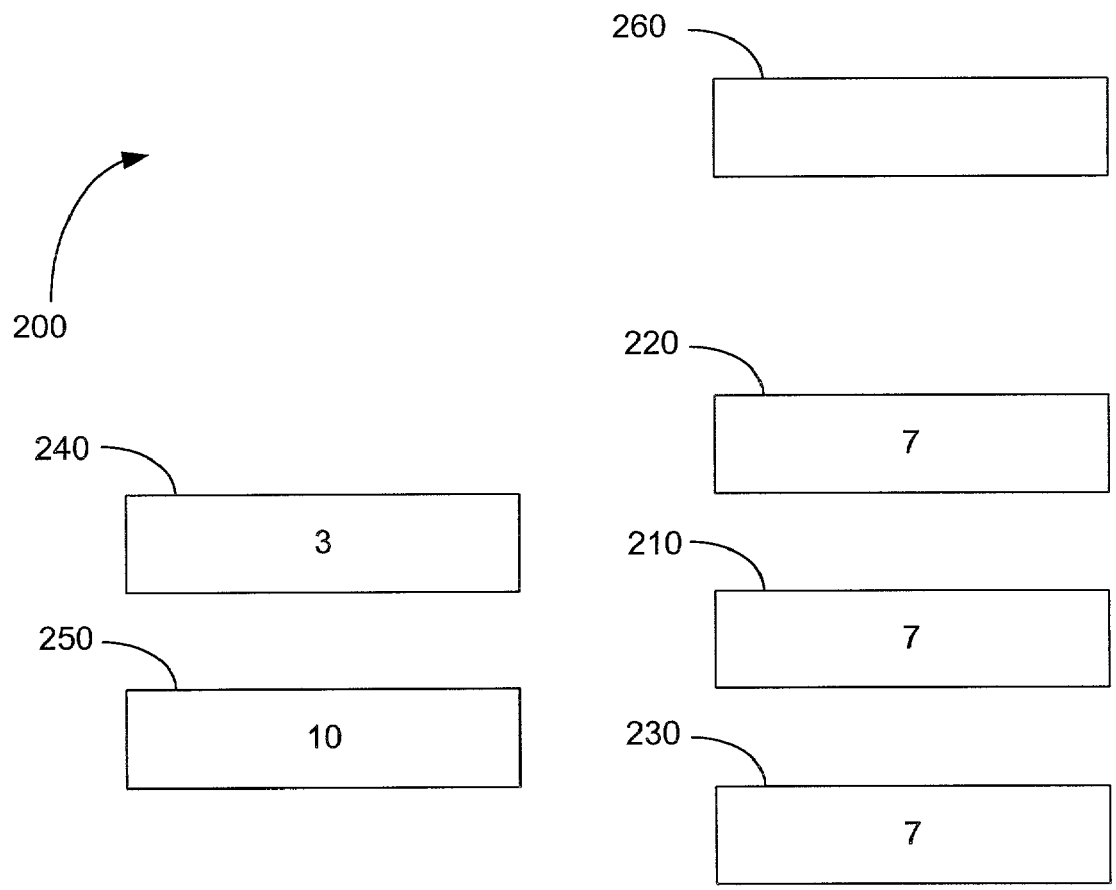
FIG. 2 is a block diagram illustrating a reservation system in accordance with the invention.

The present invention makes use of the reservation system disclosed in co-pending application Ser. No. 09/729,515 entitled "Method and System for Enhanced Concurrency in a Computing Environment." With reference to FIG. 2, a reservation system for adding within limits without blocking is generally designated 200. The system 200 includes an actual value register 210, a subtraction reservation register 220, an addition reservation register 230, a lower limit register 240, and an upper limit register 250.

A thread of execution including an update operation such as an atomic addition or subtraction operation (subtraction as addition of a negative value of an addend) is operable to operate upon a value stored in actual value register 210. By way of example, actual value register 210 is shown to have a value of 7 which may include the value of current inventory.

Subtraction and addition reservation registers 220 and 230 store a reserved value including the value of the actual value register 210 after the operation. Thus for addition, the value of addition register 230 is the actual value increased by the value of the addend and for subtraction the value of subtraction reservation register 220 is the value of the actual value decreased by the value of the addend.

Limit registers 240 and 250 store the value of the limits within which the operation is constrained. In the exemplary case of inventory control, the lower limit register 240 is shown to have a value of 3 and the upper limit register 250 is shown to have a value of 10.

Figure 3:
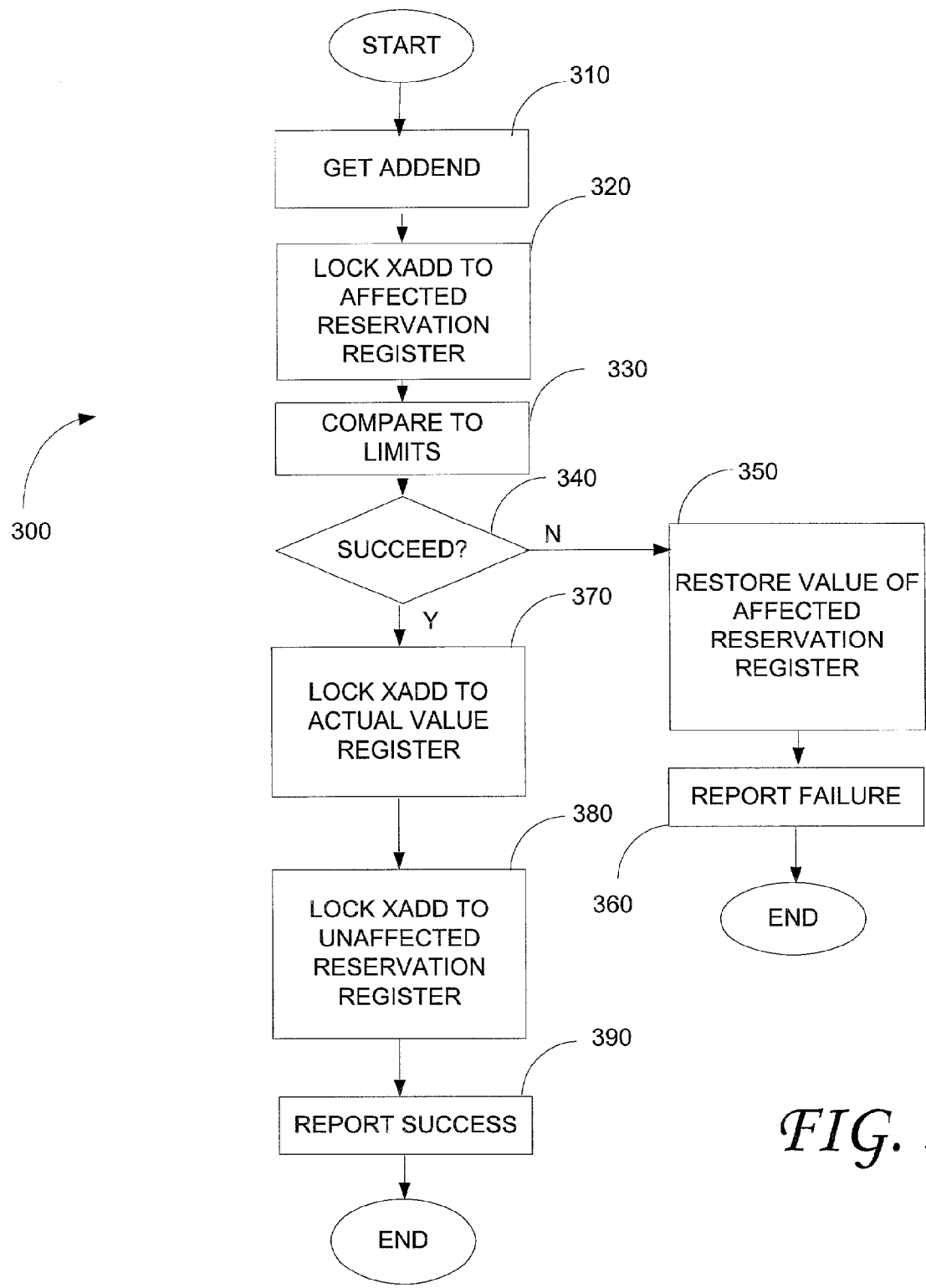
FIG. 3 is a reservation method in accordance with the invention.

With reference to FIG. 3, a method generally designated 300 operates upon the reservation system 200 as shown. In a step 310 the value of the addend, −3 in the exemplary case indicating a request for 3 items of inventory, is obtained. If the operation is addition, the value of the addend is positive, otherwise it is negative.

In a step 320 a LOCK XADD operation is performed upon the value stored in an affected reservation register using the addend. If the operation is addition, the affected reservation register is the addition reservation register 230, otherwise it is the subtraction reservation register 220. Thus in the exemplary case, the addend −3 is added to the value of the subtraction reservation register 220, resulting in a value of 4.

In a step 330, the value of the affected reservation register is compared to the value of the limit registers 240 and 250. In a step 340, it is determined if the operation can succeed within the limits. In the exemplary case, the value of the subtraction reservation register 220 is 4, which is greater than or equal to the lower limit of 3 stored in lower limit register 240 and less than or equal to the upper limit of 10 stored in the upper limit register 250. Therefore the operation can succeed within the limits.

If the operation cannot succeed, in a step 350, the value of the affected reservation register is restored by performing a LOCK XADD using the negative of the addend. Thus in the example, 3 is added back to the value of 4 stored in the subtraction reservation register 220 to restore the initial value of 7. Finally, a failure is reported in a step 360 and the process ends.

If the operation can succeed, in a LOCK XADD operation 370, the addend is added to the value stored in the actual value register 210 and written to the actual value register 210. In a step 380, in a LOCK XADD operation, the addend is added to the reservation register unaffected by the first LOCK XADD operation of step 320. In the exemplary case, the unaffected reservation register is the addition reservation register 230 and thus −3 is added to 7 and loaded into the addition reservation register 230. Finally, in a step 390, a success is reported and the process ends.

In the case where the update operation is an assignment operation, an assignment reservation register 260 is employed to store the value of the actual value register 210 after the operation. As in the case of addition and subtraction, a method for determining if the assignment can succeed within limits includes a step (not shown) in which the value of the assignment reservation register 260 is compared to the value of the limit registers 240 and 250. If the assignment operation can succeed, the assigned value is written to the actual value register 210. If the assignment operation cannot succeed, the value of the actual value register 210 is unchanged.

Figure 4:
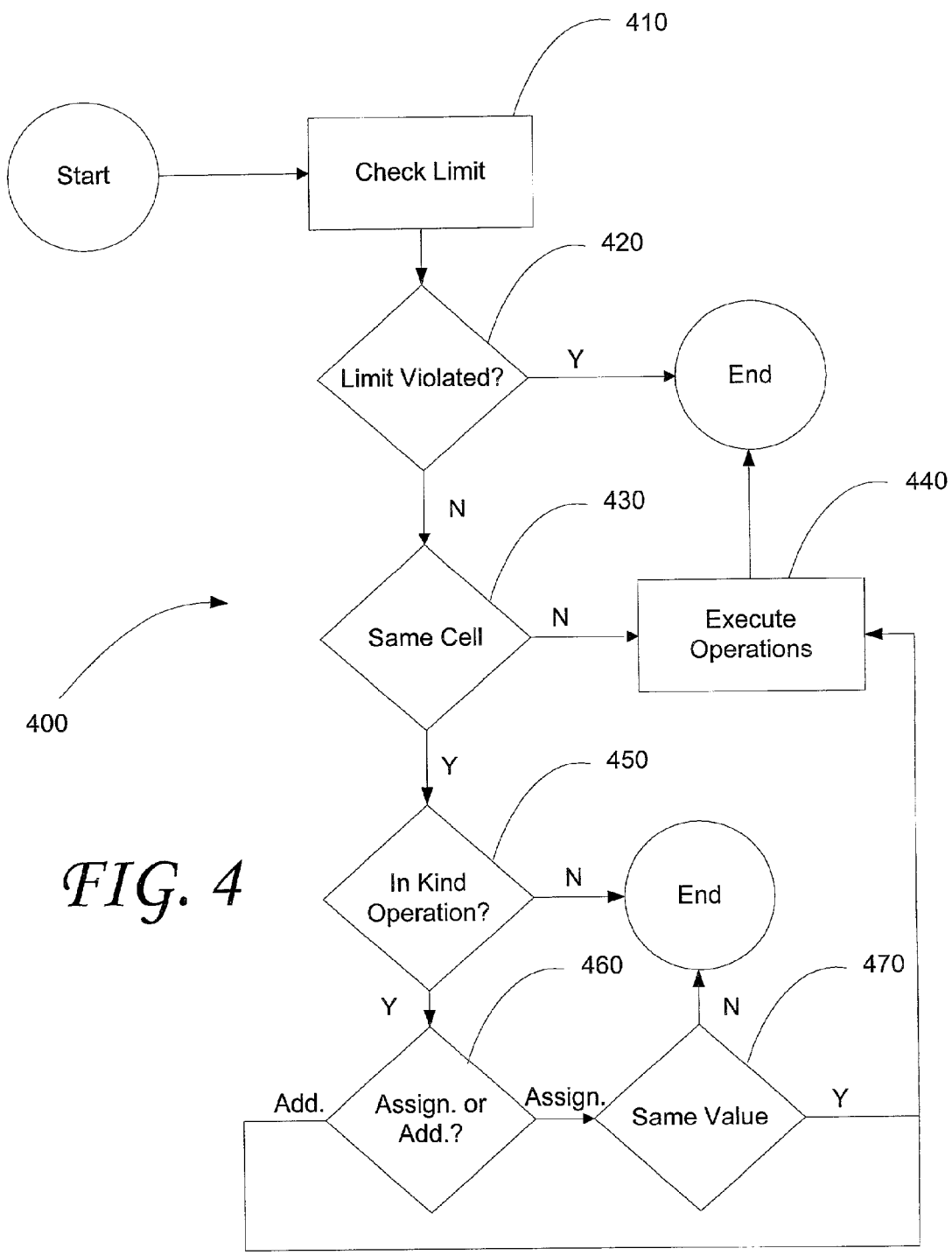
FIG. 4 is a method for the commutativity of computation operations in accordance with the invention.

With reference to FIG. 4, a method generally designated 400 for determining if computational operations are commutative includes a step 410 in which each of the computational operations are checked against a limit as described above. In a step 420 a determination is made whether the computational operations to be executed violate the limit. For those computational operations to be executed that violate the limit, the operations are not commutative, the method 400 ends, and other processes (not shown) are operative to execute the computational operations.

In a step 430, a determination is made whether any of the computational operations to be executed that do not violate the limit operate upon a same cell. For those computational operations that do not operate upon the same cell, the operations are commutative and are executed in any order in a step 440 without the need to lock the row including the cell being operated upon, and the process 400 ends.

In a step 450 a determination is made whether the computational operations determined to operate upon the same cell in step 440 are in kind operations. Two types of in kind operations in the context of update operations include addition operations (whether of positive or negative addends) and assignment operations.

If it is determined in step 450 that the operations are not in kind, that is, that one is an addition operation and the other is an assignment operation, then the operations are not commutative, the process 400 ends, and other processes (not shown) are operative to execute the computational operations.

If the computational operations are determined to be in kind in step 450 then in a step 460 a determination is made as to the type of in kind operation. If the in kind operation type is addition, then the operations are commutative and are executed in any order in step 440 and the method 400 ends.

If the in kind operation type is determined to be assignment, then in a step 470 a determination is made whether the same value is being assigned by each of the in kind operations. If the value is the same, then the in kind operations are commutative and are executed in any order in a step 440. If on the other hand the value being assigned is not the same, then the in kind operations are not commutative, the process 400 ends, and other processes (not shown) are operative to execute the computational operations.

In the context of update operations to a database, inherently commutative operations may not be commutative and inherently non-commutative operations may be commutative. For example, addition is inherently a commutative operation yet in the case where addition operations violate a limit, the operations are not commutative. Similarly, the assignment operation is not inherently commutative yet in the case where the same value is being assigned, the assignment operations are commutative. The method of the invention exploits the commutativity of certain operations to provide advantages over the prior art locking techniques.

Using the method of the invention, realtime updates to a database are enabled. If operations are determined to be commutative, the row being updated does not need to be locked and the operations can proceed in any order. Furthermore, commutative operations do not need to be put on a pending operations list and run in batches.

It has been found that the use of the described method provides for the elimination of a substantial number of the locks employed in the prior art locking technique. Furthermore, the number of servers necessary to maintain a database in an enterprise having geographically distinct locations is also reduced significantly.

The described method further provides for a substantial performance enhancement over the locking technique of the prior art. As noted above, locking is expensive. The method of the invention achieves the performance enhancement by allowing commutative operations to execute without locking.

Figure 5:
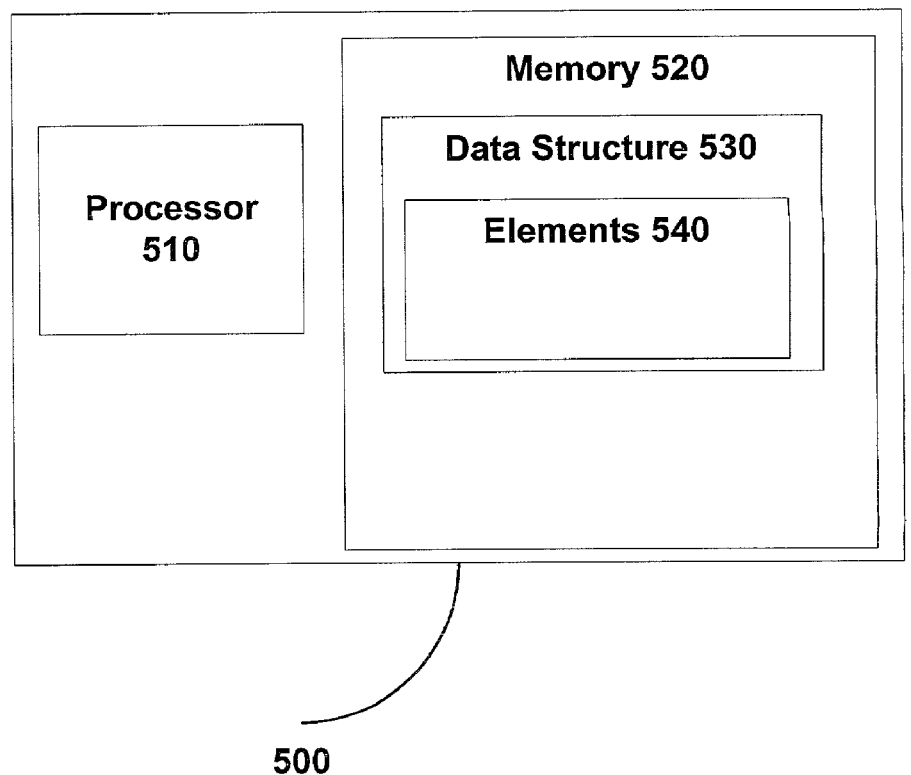
FIG. 5 is a block diagram of a computer system in accordance with the invention.

In another aspect of the invention and with reference to FIG. 5, there is shown a processing system 500 for executing two or more computational operations upon elements 540 of a data structure 530 stored in a memory 520. The processing system 500 includes a processor 510. The processor 510 includes functionality for (a) determining if any of two or more computational operations to be executed are operable upon a same element 540, (b) determining if any of the two or more computational operations determined to be operable upon the same element are in kind operations, (c) determining if any of the two or more computational operations determined to be operable upon the same element 540 and to be in kind operations are addition or assignment operations, and (d) executing the two or more computational operations determined to be operable upon the same element 540, to be in kind operations, and to be addition operations.

Several embodiments are specifically illustrated and/or described herein. However, it will be appreciated that modifications and variations are covered by the above teachings and within the scope of the appended claims without departing from the intended spirit and scope thereof.

The invention claimed is:

1. A computer readable medium containing computer readable code, the medium comprising:
a code segment for executing two computational operations if either computational operation does not violate a limit, and both computational operations do not operate upon a same element of a data structure;
a code segment for executing the two computational operations if either computational operation does not violate the limit, both computational operations operate upon the same element, and both computational operations are addition operations; and
a code segment for executing the computational operations if one but not the other of the computational operations violates the limit, both computational operations operate upon the same element, and both computational operations are assignment operations that assign a same value to the same element.

2. A method for executing two computational operations upon elements of a data structure, the method comprising the steps of:
determining if one or more of two computational operations does not violate a limit;
executing the two computational operations if either computational operation does not violate the limit, and both computational operations do not operate upon a same element;
executing the two computational operations if:
both computational operations operate upon the same element,
both computational operations are addition operations, and
one or none of the computational operations violate a limit, but not if both of the two computational operations violate a limit; and
executing the computational operations if either computational operation does not violate the limit, both computational operations operate upon the same element, and both computational operations are assignment operations that assign a same value to the same element.

3. A method for executing two computational operations upon elements of a data structure, the method comprising the steps of:
executing the two computational operations if either computational operation does not violate a limit, and both computational operations do not operate upon a same element;
executing the two computational operations if either computational operation does not violate the limit, both computational operations operate upon the same element, and both computational operations are addition operations;
executing the computational operations if either computational operation does not violate the limit, both computational operations operate upon the same element, and both computational operations are assignment operations that assign a same value to the same element; and
executing the two computational operations if one but not the other of the computational operations violates a limit, and both computational operations do not operate upon a same element.

4. A method comprising:
executing two computational operations if either computational operation does not violate a limit, and both computational operations do not operate upon a same element of a data structure;
executing the two computational operations if either computational operation does not violate the limit, both computational operations operate upon the same element, and both computational operations are addition operations; and
executing the computational operations if one but not the other of the computational operations violates the limit, both computational operations operate upon the same element, and both computational operations are assignment operations that assign a same value to the same element.

5. A system comprising:
means for executing two computational operations if either computational operation does not violate a limit, and both computational operations do not operate upon a same element of a data structure;

means for executing the two computational operations if either computational operation does not violate the limit, both computational operations operate upon the same element, and both computational operations are addition operations; and means for executing the computational operations if one but not the other of the computational operations violates the limit, both computational operations operate upon the same element, and both computational operations are assignment operations that assign a same value to the same element.

6. A computer readable medium containing computer readable code, the code comprising:
- a code segment for determining if one or more of two computational operations does not violate a limit;
- a code segment for executing the two computational operations if either computational operation does not violate the limit, and both computational operations do not operate upon a same element;
- a code segment for executing the two computational operations if:
  - both computational operations operate upon the same element,
  - both computational operations are addition operations, and
  - one or none of the computational operations violate a limit, but not if both of the two computational operations violate a limit; and
- a code segment for executing the computational operations if either computational operation does not violate the limit, both computational operations operate upon the same element, and both computational operations are assignment operations that assign a same value to the same element.

7. A system comprising:
- means for determining if one or more of two computational operations does not violate a limit;
- means for executing the two computational operations if either computational operation does not violate the limit, and both computational operations do not operate upon a same element;
- means for executing the two computational operations if:
  - both computational operations operate upon the same element,
  - both computational operations are addition operations, and
  - one or none of the computational operations violate a limit, but not if both of the two computational operations violate a limit; and
- means for executing the computational operations if either computational operation does not violate the limit, both computational operations operate upon the same element, and both computational operations are assignment operations that assign a same value to the same element.

8. A computer readable medium containing computer readable code, the code comprising:
- a code segment for executing the two computational operations if either computational operation does not violate a limit, and both computational operations do not operate upon a same element;
- a code segment for executing the two computational operations if either computational operation does not violate the limit, both computational operations operate upon the same element, and both computational operations are addition operations;
- a code segment for executing the computational operations if either computational operation does not violate the limit, both computational operations operate upon the same element, and both computational operations are assignment operations that assign a same value to the same element; and
- a code segment for executing the two computational operations if one but not the other of the computational operations violates a limit, and both computational operations do not operate upon a same element.

9. A system comprising:
- means for executing the two computational operations if either computational operation does not violate a limit, and both computational operations do not operate upon a same element;
- means for executing the two computational operations if either computational operation does not violate the limit, both computational operations operate upon the same element, and both computational operations are addition operations;
- means for executing the computational operations if either computational operation does not violate the limit, both computational operations operate upon the same element, and both computational operations are assignment operations that assign a same value to the same element; and
- means for executing the two computational operations if one but not the other of the computational operations violates a limit, and both computational operations do not operate upon a same element.

* * * * *